United States Patent [19]
Ellson et al.

[11] Patent Number: 5,583,666
[45] Date of Patent: Dec. 10, 1996

[54] METHOD FOR CROSS-DEVICE COLOR CALIBRATION AND ENHANCEMENT USING EXPLICIT CONSTRAINTS

[75] Inventors: Richard N. Ellson, Rochester; Kevin E. Spaulding, Spencerport; Andrew H. Mutz, Rochester; Ron Gershon, Pittsford, all of N.Y.

[73] Assignee: Eastman Kodak Company, Rochester, N.Y.

[21] Appl. No.: 390,157

[22] Filed: Feb. 16, 1995

Related U.S. Application Data

[63] Continuation of Ser. No. 17,094, Feb. 12, 1993.

[51] Int. Cl.$^6$ .............................. G02B 7/00; G02B 5/12; H04N 9/64; G09G 5/04
[52] U.S. Cl. .................. 358/518; 358/504; 358/522; 358/523; 358/524; 358/525; 358/538; 348/652; 345/154
[58] Field of Search ................ 358/504, 518, 358/515, 519, 522, 538, 520, 525, 448, 452, 453, 447, 523, 524; 382/254; 345/153, 154; 348/652, 653, 659

[56] References Cited

U.S. PATENT DOCUMENTS

| | | | |
|---|---|---|---|
| 4,464,677 | 8/1984 | Khun et al. | 358/75 |
| 4,477,833 | 10/1984 | Clark et al. | 358/80 |
| 4,500,919 | 2/1985 | Schreiber | 358/78 |
| 4,941,039 | 7/1990 | E'Errico | 358/80 |
| 4,945,406 | 7/1990 | Cok | 358/80 |
| 4,984,072 | 1/1991 | Sandrew | 348/29 |
| 4,992,862 | 2/1991 | Gabor | 358/76 |
| 5,073,818 | 12/1991 | Iida | 358/80 |
| 5,081,529 | 1/1992 | Collette | 358/80 |
| 5,105,267 | 4/1992 | Hayashi | 358/519 |
| 5,109,272 | 4/1992 | Kinoshita et al. | 358/75 |
| 5,121,198 | 6/1992 | Maronian | 358/76 |
| 5,200,816 | 4/1993 | Rose | 395/11 |
| 5,218,671 | 6/1993 | Liao et al. | 395/131 |
| 5,239,370 | 8/1993 | Yamaguchi | 358/518 |
| 5,243,414 | 9/1993 | Dalrymple et al. | 358/500 |
| 5,285,297 | 2/1994 | Rose et al. | 358/518 |
| 5,323,249 | 6/1994 | Liang | 358/518 |
| 5,331,439 | 7/1994 | Bachar | 358/520 |

FOREIGN PATENT DOCUMENTS

| | | | |
|---|---|---|---|
| 0546773A2 | 12/1992 | European Pat. Off. | G06F 3/023 |
| 0565283A1 | 3/1993 | European Pat. Off. | H04N 1/46 |

OTHER PUBLICATIONS

O. C. Zienkiewicz, FRS, "The Finite Element Method", McGraw Hill Book Company (UK) Limited, pp. 1–92, 135–175, 527–606 and 677–757.

Journal of Imaging Science and Technology, vol. 37, No. 1, Jan./Feb. 1993 "A New Method for Color Correction in Hardcopy from CRT Images" by H. Haneishi, et al, pp. 30–36.

*Primary Examiner*—Kim Yen Vu
*Assistant Examiner*—Kimberly A. Williams
*Attorney, Agent, or Firm*—Gordon M. Stewart

[57] ABSTRACT

This invention provides a method for transforming an input color space to an output color space where each of a plurality of specified colors and/or color regions are constrained to be transformed by any one of a plurality of explicitly specified color calibration or color enhancement strategies. The method involves a two step process: 1) constraints are applied to some subset of the points in the input color space explicitly specifying the transform into the output color space; 2) the reminder of the points are then transformed by a mapping strategy which preserves color continuity. The mapping strategy used in the preferred embodiment is based on a computer graphics geometric morphing technique. In the preferred embodiment, multi-dimensional look-up tables are used to implement the color transformation.

37 Claims, 10 Drawing Sheets

METHOD FOR CROSS-DEVICE COLOR CALIBRATION AND ENHANCEMENT USING EXPLICIT CONSTRAINTS

CROSS REFERENCE TO RELATED APPLICATIONS

This is a Continuation of application U.S. Ser. No. 017/094, filed Feb. 12, 1993.

The present Application is related to U.S. patent application Ser. No. 08/017,198, entitled "Method and Associated Apparatus for Transforming Input Color Values in an Input Color Space to Output Color Values in an Output Color Space" filed on even date with the present Application.

FILED OF THE INVENTION

The present invention relates to the field of digital image processing and more particurly to color calibration and color enhancement for digital imaging systems. It consists of a method for mapping colors in one color space to colors in another color space. Explicit constraints are applied to specify the color mapping for some subset of the colors.

BACKGROUND OF THE INVENTION

For color digital imaging systems, each step of the imaging chain (original scene, image capture, image storage, image transmission, soft display, hard copy display, etc.) will, in general, have different color spaces, as well as different color gamuts. Typical color spaces would include device-dependent spaces such as RGB, CMY, and CMYK or device-independent spaces such as CIE tristimulus (XYZ), CIELAB, and CIELUV. The term color gamut is generally used to refer to the range of colors which can be represented and/or displayed at some particular stage in the system. The color gamut of a display device may be quite different from the gamut of the image capture device and/or the gamut of colors in some original real world scene. Additionally, the gamut of colors which can be displayed with one device may be substantially different from the color gamut of some other device. For example, consider FIG. 1 which illustrates the color gamut of a typical RGB color video monitor, as compared to the gamut of a Kodak XL7700 color printer. The plot shows a slice through the gamuts in CIELAB color space at a lightness value of L*=50.0. The area of overlap for the two gamuts indicates the colors which can be produced on both devices. The regions which are inside only one of the curves represent colors which can be produced on one device, but not on the other. The color values which are outside both curves cannot be produced by either device. For this example, it can be seen that the video monitor can produce much more saturated blues than the thermal printer at this lightness level, but the thermal printer, on the other hand, can produce more saturated yellows.

In many applications, it is necessary to take color image data which exists in one color space and map it into a different color space. Because of the differences in the color spaces and the color gamuts of various devices, several problems arise in this process. The first one is the matter of color calibration. That is, how do you specify the color on one device so that the perceived color matches that of another device. For example, one might have an image which is displayed on a video monitor and would then like to create a print which has the same perceived color reproduction. This problem is essentially one of transforming from one device-dependent color space to another. In the example just given, this would involve transforming from the monitor RGB space to the printer CMY(K) space. If all of the colors in the image are in the overlap region of the two color gamuts then this transformation is relatively straightforward and can be done using techniques such as multi-dimensional look-up-tables (see: W. F. Schreiber, "Color Reproduction System," U.S. Pat. No. 4,500,919 (Feb. 19, 1985)).

However, if some of the colors in the input color space are outside of the gamut of the output color space, the problem is somewhat more complicated. The question then becomes what should be done with the out-of-gamut colors. Several different methods to handle this problem have been suggested in the past. Some of the more common approaches have been to maintain the hue angle and lightness for the out-of-gamut colors and clip the saturation to the gamut boundary, or to somehow compress the gamut so that the input color gamut fits within the output color gamut. (for example, see R. S. Gentile, E. Walowit and J. P. Allebach, "A comparison of techniques for color gamut mismatch compensation," J. Imaging Technol. 16, 176–181 (1990)). For many kinds of images, such as photographic scenes, the saturation clipping approach may yield acceptable results because very few out-of-gamut colors will occur. However, for other types of images, such as computer generated presentation graphics, a large percentage of the colors may be outside the gamut. This is due to the fact that saturated colors are very appealing for many kinds of graphics such as pie charts, and slide presentations, etc. Using an approach which clips the saturation or compresses the gamut may yield quite unacceptable results due to the fact that the resulting images will be noticeably lower in saturation (i.e., the colors will appear to be more pastel, and will have less "snap"). As a result, different techniques are necessary to map the input color gamut into the output color space. Since this involves modifying the colors in the image, rather than simply matching the colors from one device to another, this falls into the category of "color enhancement."

In addition to addressing the reproduction of out of gamut colors, color enhancement can also include other forms of color transformation. For example, one might want to boost the saturation of a hazy image, adjust the hue of an object in the image, or increase the color contrast between different objects in the image. Different color enhancement methods include using combinations of matrices and one-dimensional look-up tables (for example see: Robert P. Collette, "Color and tone scale calibration system for a printer using electronically generated input images," U.S. Pat. No. 5,081,529, Jan. 14, 1992), and global gamut mapping techniques (for example see K. Spaulding, R. Gershon, J. Sullivan, and R. Ellson, "Method and Associated Apparatus for Transforming Input Color Values in an Input Color Space to Output Color Values in an Output Color Space", referenced above as U.S. patent application Ser. No. 08/017,198. With any of these approaches, specifying a mapping that has the desired effect on the saturated colors without having undesirable side effects on other colors can be quite difficult or even impossible. For example, skin tones which might occur in the image might end up turning greenish, etc.

This invention addresses a method for mapping (transforming) one color space into another by explicitly specifying the mapping for some subset of the points within the color space and for determining the remaining unconstrained points according to a defined mapping strategy.

SUMMARY OF THE INVENTION

This invention consists of a method for mapping one color space to some other color space to apply a desired color calibration and/or color enhancement strategy. The method broadly involves a two step process: 1) constraints are applied to some subset of the points in the input color space explicitly specifying the mapping into the output color space; 2) the remainder of the points are then mapped according to a defined mapping strategy. The mapping strategy used in the preferred embodiment is based on a computer graphics geometric morphing technique.

The method of the present invention can best be described as a method for transforming input color values in an input color space to output color values in an output color space, comprising the steps of:

a) forming one or more subsets of input color values from portions of the input color space;

b) assigning a color transform to each subset of input color values formed in step a);

c) forming the subset of input color values not included in the subsets of step a);

d) forming a color transform for the input colors of step c) which preserves continuity with the transforms of step b); and e) transforming input color values in the input color space to output color values in the output color space using the combined transforms of steps b) and d).

From the foregoing it can be seen that it is a primary object of the present invention to provide an improved method for transfoming an input color gamut to fit within an output color gamut.

The above and other objects of the present invention will become more apparent when taken in conjunction with the following description and drawings, wherein like characters indicate like parts.

DETAILED DESCRIPTION OF THE INVENTION

The present invention consists of a method for mapping digital color image data in one color space into some other color space. For example, it may be desired to convert from monitor RGB values to CMY(K) values for some thermal printer. Due to desired color enhancements, or because of the mismatch that may exist between the color gamuts for the different devices, it may be necessary and/or desirable to perform the conversion in such a way that colorimetric accuracy of some or all of the colors is not preserved. Using conventional approaches, it is difficult to specify a mapping function which has the desired effect on certain colors without having undesirable effects on other colors. For example, a mapping which produces more saturated primary colors may change the hue of skin tones in the image. This invention solves this problem by exactly constraining the color mapping for a subset of the color values and using some specified color mapping algorithm to specify the remaining color values in some smooth fashion. It is therefore possible to simultaneously perform various kinds of color enhancement on various subsets of the input color space, while maintaining colorimetric reproduction of other subsets of the input color space. Similarly, global color enhancement strategies, or conventional gamut mapping strategies can also be performed within this framework by constraining the color mapping for the appropriate subset of the input color space. This approach, therefore, can be used to implement any kind of color conversion or color enhancement strategy.

Figure 1:
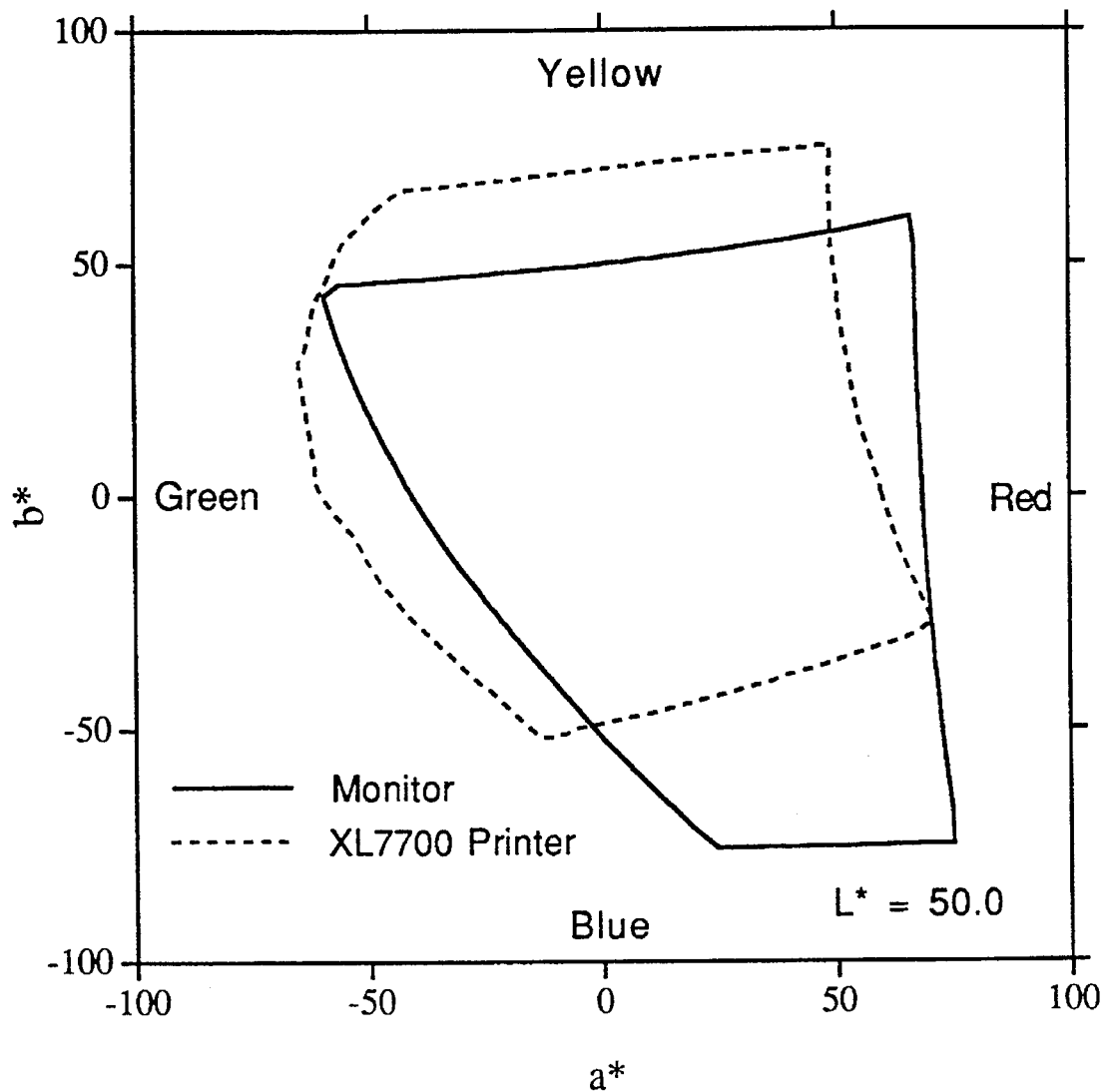
FIG. 1 is a plot showing the difference between the color gamuts for a typical video monitor and a Kodak XL7700 thermal printer at a lightness of $L^*=50.0$.
Figure 2:
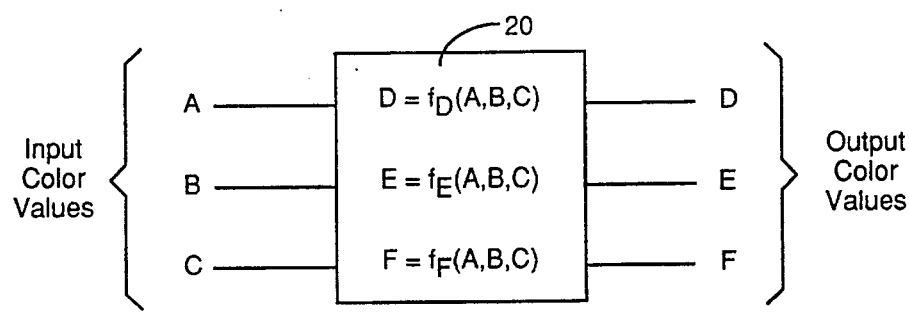
FIG. 2 is a block diagram of a general color mapping algorithm where the output color values are a function of all of the input color values.

FIG. 2 illustrates a generalized color mapping function 20 which transforms multi-channel input color values in an input color space denoted ABC (where ABC could represent RGB, CMY, CMYK, XYZ, CIELAB, etc.) into multi-channel output color values in an output color space denoted DEF. The output color space may or may not be a different color space than the input color space. In general, the input and output color spaces will be specified by three color values, but in some cases there may be additional values, such as for CMYK color spaces associated with color printers.

Figure 3:
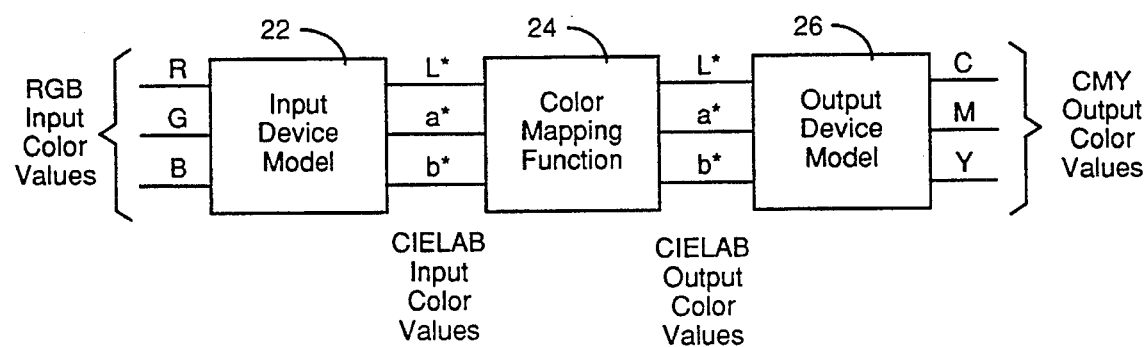
FIG. 3 is a block diagram of a typical color mapping sequence.

Depending on the application, the color transformation may go directly from the input color space to the desired output color space, or may involve a multiple stage process with some intermediate color space(s). FIG. 3 illustrates the case of transforming from a monitor RGB space to some printer CMY space using CIELAB as an intermediate color space. The first stage in this sequence involves converting the RGB input color values to corresponding CIELAB input color values using an input device model 22. CIELAB output color values are then calculated using the color mapping function 24. Finally, the CIELAB output color values are converted to CMY output color values using an output device model 26. Each of the color conversion stages in this sequence could consist of analytic functions (continuous, or piecewise), or multi-dimensional look-up tables. The present invention is capable of being incorporated into any of the color conversion stages. Additionally, several stages could be combined to form a single stage which could incorporate the present invention.

The color conversion method embodied in this invention consists of a two step process. First, constraints are applied to some subset of the points in the input color space explicitly specifying the mapping into the output color space. Second, the remaining unconstrained points in the input color space are then mapped according to a defined mapping strategy.

Figure 4:
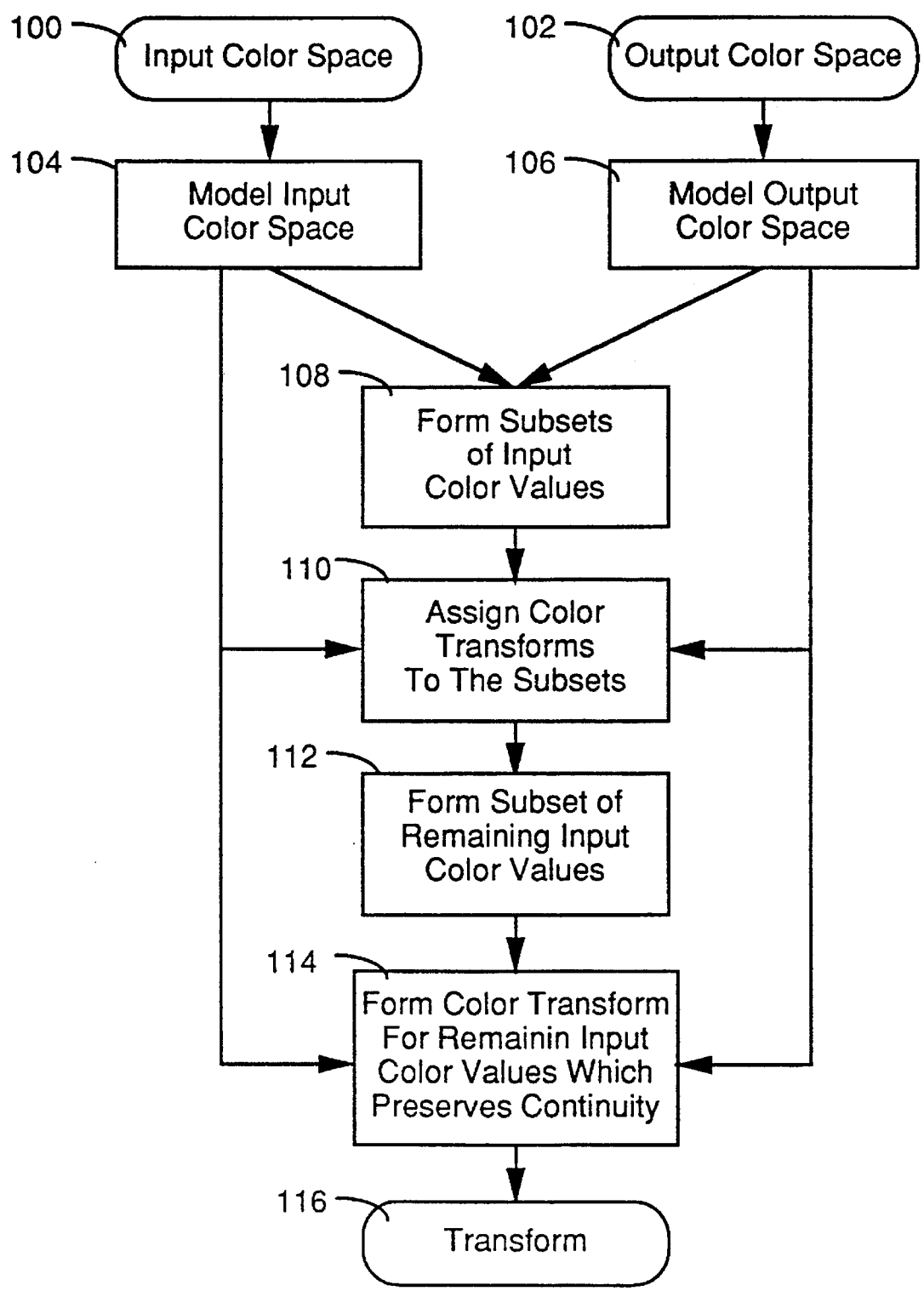
FIG. 4 is a flow chart illustrating the method of the invention.

FIG. 4 illustrates in detailed block diagram form the methodology of the present invention. Models of an input and an output color space, 104 and 106, are formed for an input color space 100 and an output color space 102, respectively, to relate input and output color values to color values in a standard color space. Box 108 forms subsets of input color values by grouping them based on a common property, such as flesh tones, or purpose, such as a single object in a scene. In Box 110 each of the subsets formed in box 108 is assigned a color transform. The color transform maps points in the input color space to points in the output color space according to a selected strategy and with inputs of the modeled color spaces 104 and 106. Strategies include, but are not limited to colorimetric reproduction, photographic reproduction, and color enhancements. In Box 112 the remaining color values are grouped into a set. In Box 114 the set of color values formed in Box 112 are transformed in a fashion which preserves color continuity between the subsets transformed in Box 110 using inputs of the modeled color spaces 104 and 106. The product of the operations of Box 110 and 114 form a transform 116 for the set of all colors in the input color space.

The first step of the process is the specification of the color mapping from the input color space to the output color space for a subset of the colors that will be constrained in the mapping process. The particular subset of colors that is constrained, as well as the color mapping strategy for those colors, will depend on the specific application. The subset of constrained colors might correspond to the color calibration data available, or might reflect a particular color enhancement goal. For some applications, one might want to constrain the mapping for the neutral tones and the primary colors. For other applications, one might want to constrain saturated colors, or colors which are important for photographic images such as skin tones, sky colors or grass colors. For the various subsets of colors, several color mapping strategies could be used such as colorimetric matching, a model of the photographic process, or some enhancement strategy such as the method described by Spaulding et. al. (U.S. patent application Ser. No. 08/017,198 Kodak Docket No. 67,248).

Figure 5:
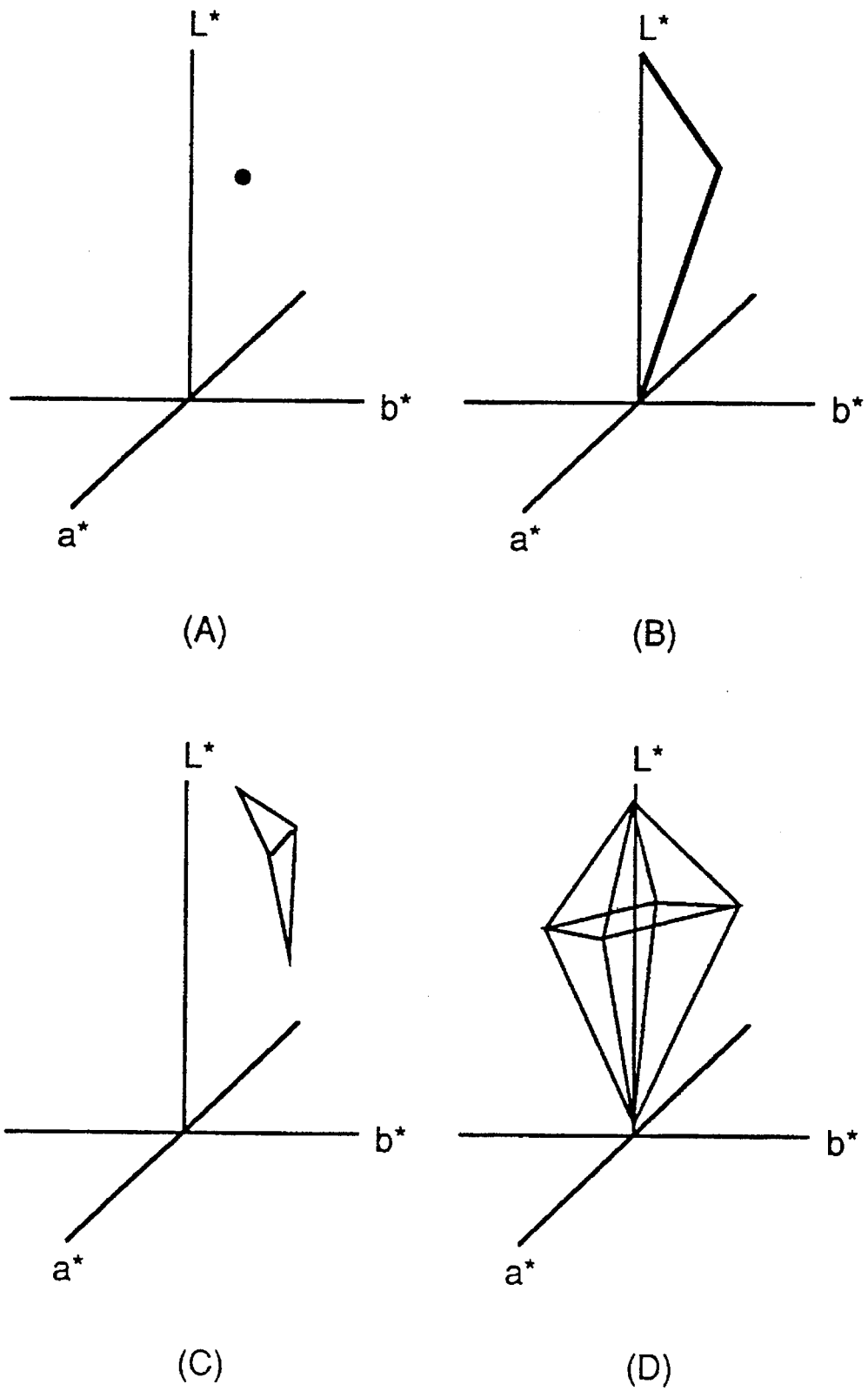
FIG. 5 illustrates several different types of constrained point subsets. A) is a point constraint, B) is a line constraint, C) is a surface constraint, and D) is a volume constraint.

Various color mapping strategies can be applied to different subsets of colors. FIG. 5 shows several different classes of subsets of constrained colors. FIG. 5(A) illustrates a point constraint. This could be used to constrain the color reproduction of a single color such as a skin tone, or a corporate trademark color, such as Kodak trade dress yellow. FIG. 5(B) illustrates a line constraint. This could be used to constrain a shadow or highlight a series for a particular colored surface, or to constrain colors on the neutral axis, etc. FIG. 5(C) illustrates a surface constraint. For example, this could be used to constrain the surface of the color gamut. FIG. 5(D) illustrates a volume constraint. This could be used to constrain the set of all colors with low saturation, or colors within the convex hull of all skin tone colors, etc. It should be understood that other classes of subsets of constrained colors could also be used. For example, if the input color space were a CMYK device color space, a 4-dimensional hyper-volume of constrained colors could be constrained. It is also possible to combine these various constraint classes to form a single constraint set. For example, one might constrain a corporate trademark color using a point constraint, the neutral axis using a line constraint, the gamut surface using a surface constraint, and the colors within the convex hull of all skin tone colors using a volume constraint. Different mapping strategies could be used for each of the different subsets of constrained colors. For example, the corporate trademark color could be mapped to the appropriate Pantone specification, the neutral axis could be mapped colorimetrically, the skin tones could be mapped using a model of the photographic process and the gamut surface could be mapped using a color enhancement strategy to maximize color saturation.

Once the set of constrained colors, as well as the color mapping strategy for those constrained colors, has been defined, it is then necessary to determine the color mapping for the remaining colors, which correspond to colors outside the set of constrained colors. Several mapping strategies for the unconstrained colors could be used that vary in the complexity of implementation, and the smoothness and acceptability of the results. Some of the simplest strategies would include multi-dimensional interpolation techniques such as tri-linear, tetrahedral, and basis spline interpolation. (for example, see: John R. D'Erico, "Color image reproduction apparatus having a least squares look-up table augmented by smoothing," U.S. Pat. No. 4,941,039, Jul. 10, 1990, K. Kanamori and H. Kotera, "Color correction technique for hard copies by 4-neighbors interpolation method," J. Imag. Sci. Technol. Vol 36, pp. 73–80 (1992)). Generally, these techniques have been developed for the calibration of a device from experimentally measured data, but they could be adapted to handle the present color enhancement algorithm as well. Another strategy, which is the preferred embodiment of this invention, is to apply computer graphics shape transformation (morphing) techniques (J. Kent, W. Carlson, and R. Parent, "Shape Transformation for polyhedral objects," Proceedings of SIGGRAPH '92, Chicago, July 1992, In Computer Graphics, 26 47–54 (1992)) to determine the unconstrained points. This technique allows for points in the input color space to be mapped smoothly and continuously to points in the output color space by the minimization of the value of a cost function which is a function of color differences between nearby color values. The cost function is formulated to maximize local continuity and smoothness in the color mapping function.

Figure 6:
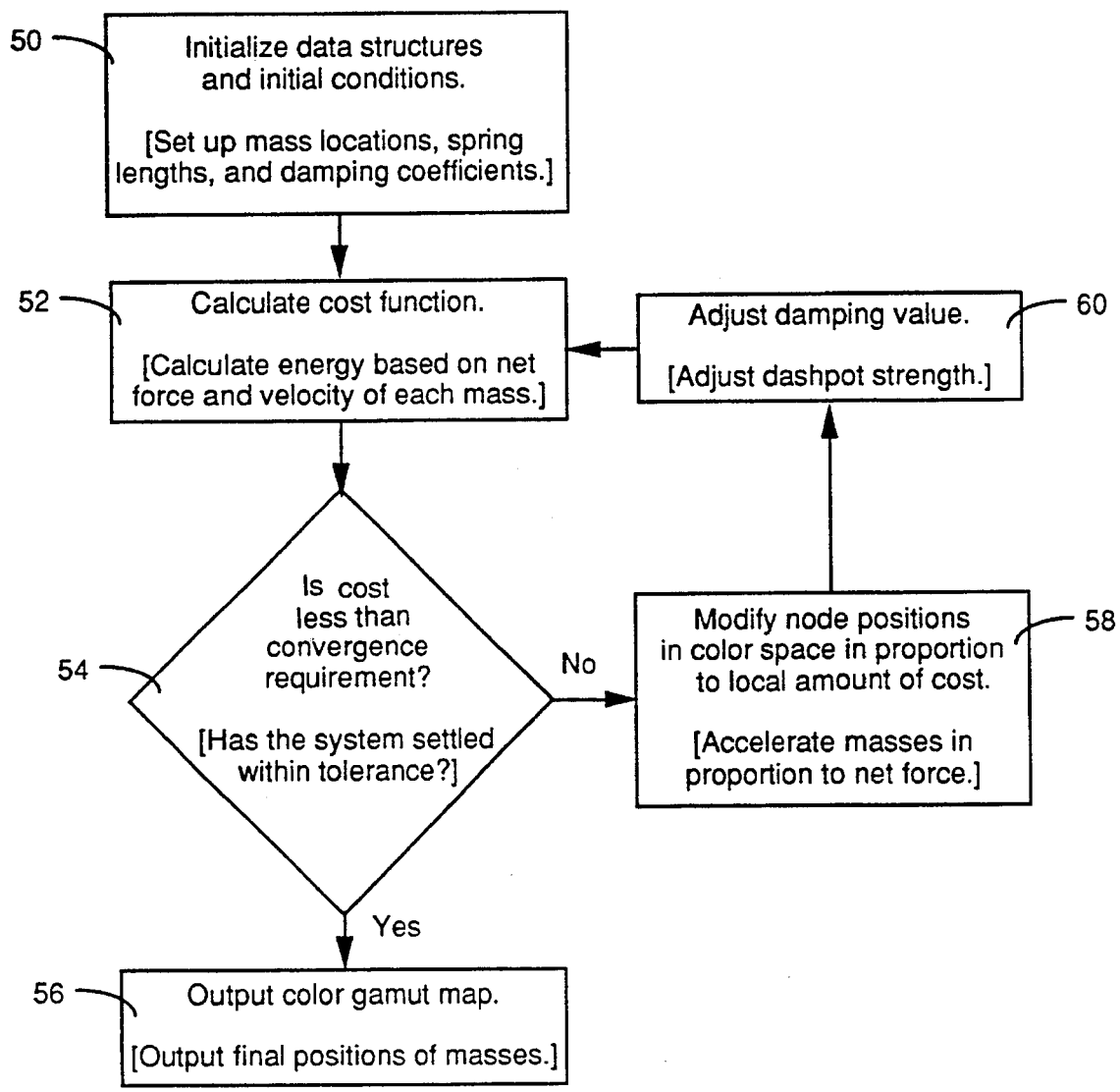
FIG. 6 is a block diagram of a geometric morphing algorithm for color mapping.

FIG. 6 illustrates a flow chart describing the cost minimization process used in the preferred embodiment of this invention to determine the final color mapping function. With this method, a lattice of nodes is set up where the coordinates of the node corresponds to the color in the output color space. The coordinates of nodes corresponding to the constrained colors are fixed, while the coordinates of the remaining nodes are allowed to vary. The node positions which determine the local minimum for the cost function are determined using a dynamic process based on a volumetric elastic continuum model (for example, see: Herbert Goldstein, Classical Mechanics, Addison-Wesley Publishing Co. Inc., Reading, Massachusetts, 1959 pages 347–355. This model can be implemented in discrete form using a system of masses connected by mechanical springs and dashpots (for example, see: O. C. Zienkiewicz, The Finite Element Method, 3rd Edition, McGraw Hill, 1977 pages 1–92, 135–175, 527–606, and 677–757. This system of masses, springs, and dashpots is initialized, and then allowed to relax into an equilibrium state. In the preferred embodiment, the coordinates of the nodes in output color space are analogous to the positions of the masses in the physical space for the mechanical model. The network of springs connecting the masses in the mechanical model correspond to the cost function penalizing nonuniform node spacing. The dashpots correspond to the damping process which allows equilibrium to be achieved. In practice, the dynamic process is simulated using an iterative computer algorithm. The final result of the optimization process is a specification of the color mapping for a series of input colors which occur on a fixed lattice. In general, the number of nodes in the lattice will be smaller than the number of points in the input color space. The color mapping for the input color values which occur between the lattice nodes can be determined using standard interpolation techniques such as those described by Schreiber ("Color reproduction system," U.S. Pat. No. 4,500,919, Feb. 19, 1985).

Figure 7:
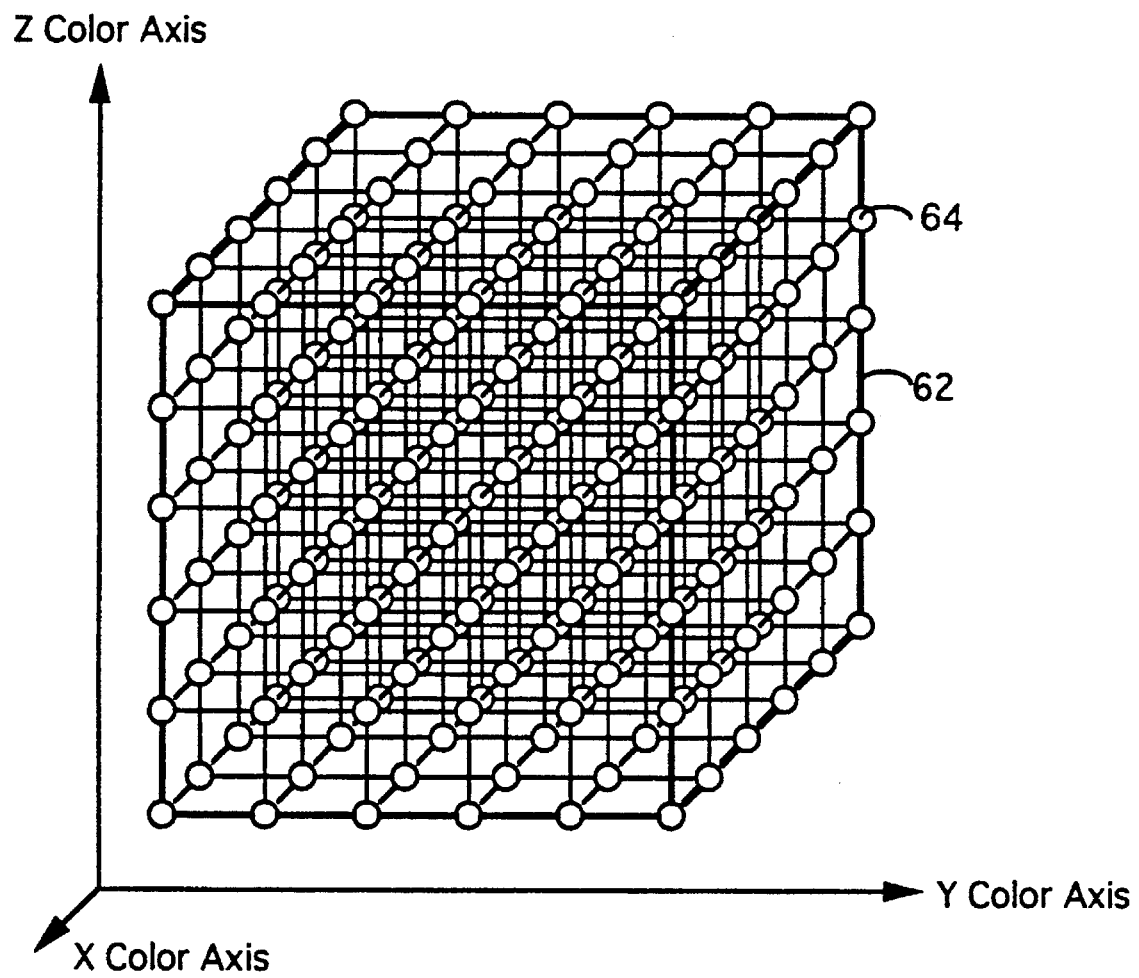
FIG. 7 is a cubic lattice of nodes.

Referring to FIG. 6, the first step in the process of determining the optimized color mapping functions involves the initialization of the data structures and initial conditions 50. In the preferred embodiment of this invention, a quantized array of input color values is first defined on a regular lattice structure having nodes 64 and connections 62, as shown in FIG. 7. For example, if the input color space is a video RGB space, the nodes in the lattice are each identified with red (R), green (G), and blue (B) values uniformly distributed over the range of the input color values. If the RGB values were in the range of 0 to 255, and there were 52 nodes for each dimension of the lattice, the three node indices would follow the sequence 0, 1, 2, . . . 51, and the corresponding color values would be 0, 5, 10, . . . 255. Each node in the lattice has associated with it a location in the output color space. For example, if the output color space were CIELAB, each node in the lattice would have an associated $L^*$, $a^*$ and $b^*$ coordinate. The nodes which are contained in the set of constrained colors are tagged to be fixed nodes, and their coordinates are determined based on the selected color mapping strategy. The initial coordinates for the remaining unconstrained nodes in the lattice can either be set to the color value of the node in the input color space, or can be interpolated and/or extrapolated from a subset of the constrained points.

Figure 8:
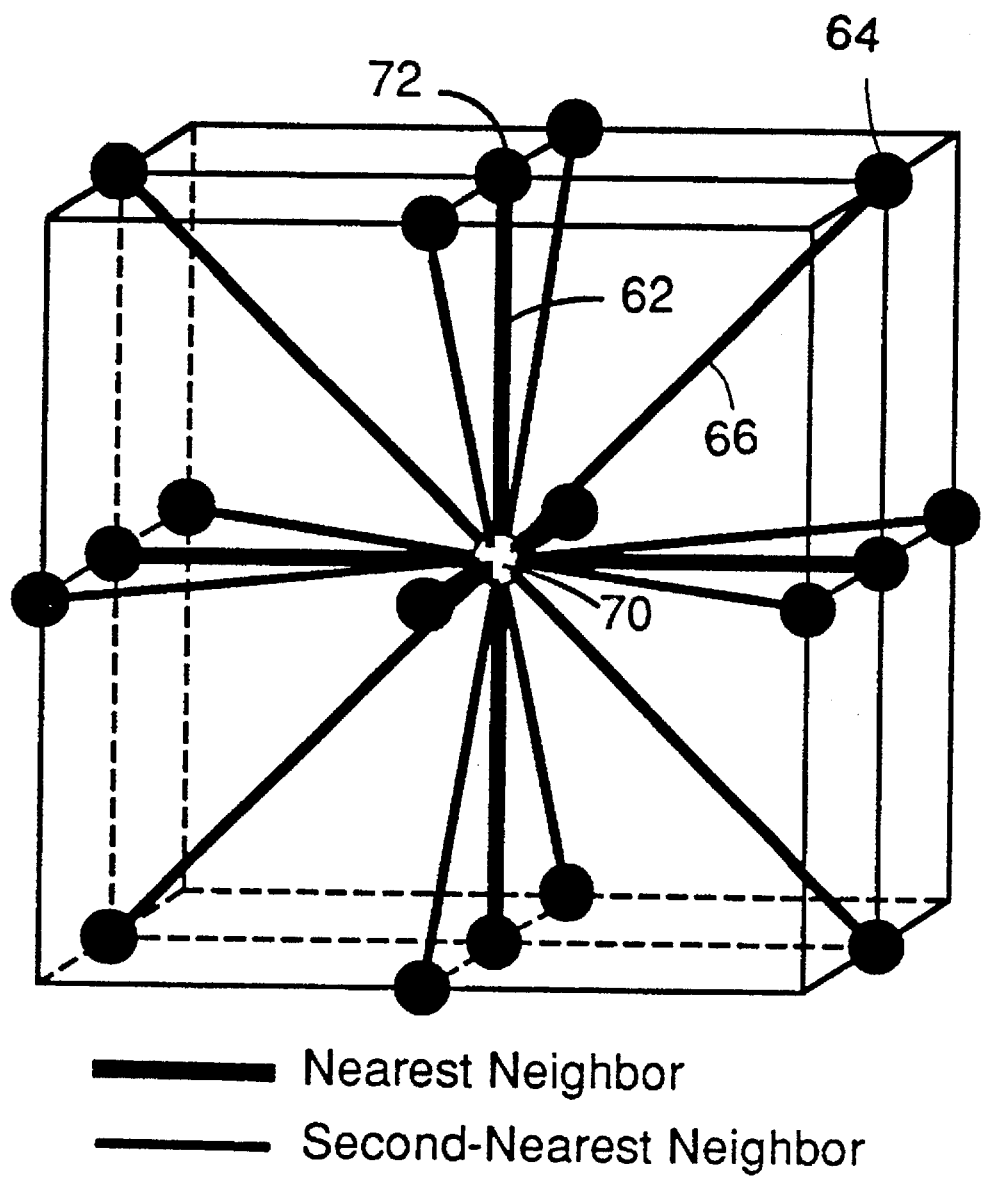
FIG. 8 is a diagram of a lattice node showing spring connections to its nearest neighbors and second-nearest neighbors.

Continuity and smoothness between nearby color values is desirable for an acceptable color mapping function. In general, the initial node coordinates do not satisfy the continuity and smoothness conditions because of the application of different color mapping strategies for different subsets of constrained colors, and the discontinuities introduced between the constrained and unconstrained regions of the lattice nodes. To restore the desired continuity and smoothness, a cost function is defined per block 52 which is a quantitative measure of the irregularity of the node lattice. The node cost function for each of the unconstrained nodes is defined by analogy to the net force on a mass connected by a system of mechanical springs to nearby masses. In this embodiment, the cost function for each node is a function of the color difference, represented by the lengths of the connections 62 and 66, in a standard color space between the node 70 and its nearest and second-nearest neighbor nodes 72 and 64, respectively, in the lattice as shown in FIG. 8. Other embodiments involve the use of a different number or configuration of neighboring nodes. The cost function for each node is, by analogy, the magnitude of the net force upon the corresponding mass imposed by the connecting springs. The magnitude of the force applied by each spring connection is proportional to the difference between the current spring length and the resting distance (zero-force distance). Because the rest lengths of the springs vary smoothly, the lowest cost positions of the masses will also have smoothly varying spacings. In output color space, this will correspond to smoothly varying color differences. The total cost is defined to be the sum of the costs for each of the unconstrained nodes.

In the process of determining the minimum cost node coordinates, the total cost is calculated for the current node coordinates. This total cost is then compared to the convergence requirement per block 54. If convergence has not been achieved, the node coordinates are changed in proportion to the local vector value of the cost function per block 58 and 60. Using the mass and spring analogy, the mass is moved as a function of the net force applied according to conventional mechanical models (for example, see: Herbert Goldstein, *Classical Mechanics*, Addison-Wesley Publishing Co. Inc., Reading, Massachusetts, 1959). When convergence is reached the final node coordinates are recorded and outputted per block 56. The final node coordinates effectively comprise a multi-dimensional look-up table which can then be used to calculate the output color value corresponding to each input color value, subject to the quantization limit of the output device.

Figure 9:
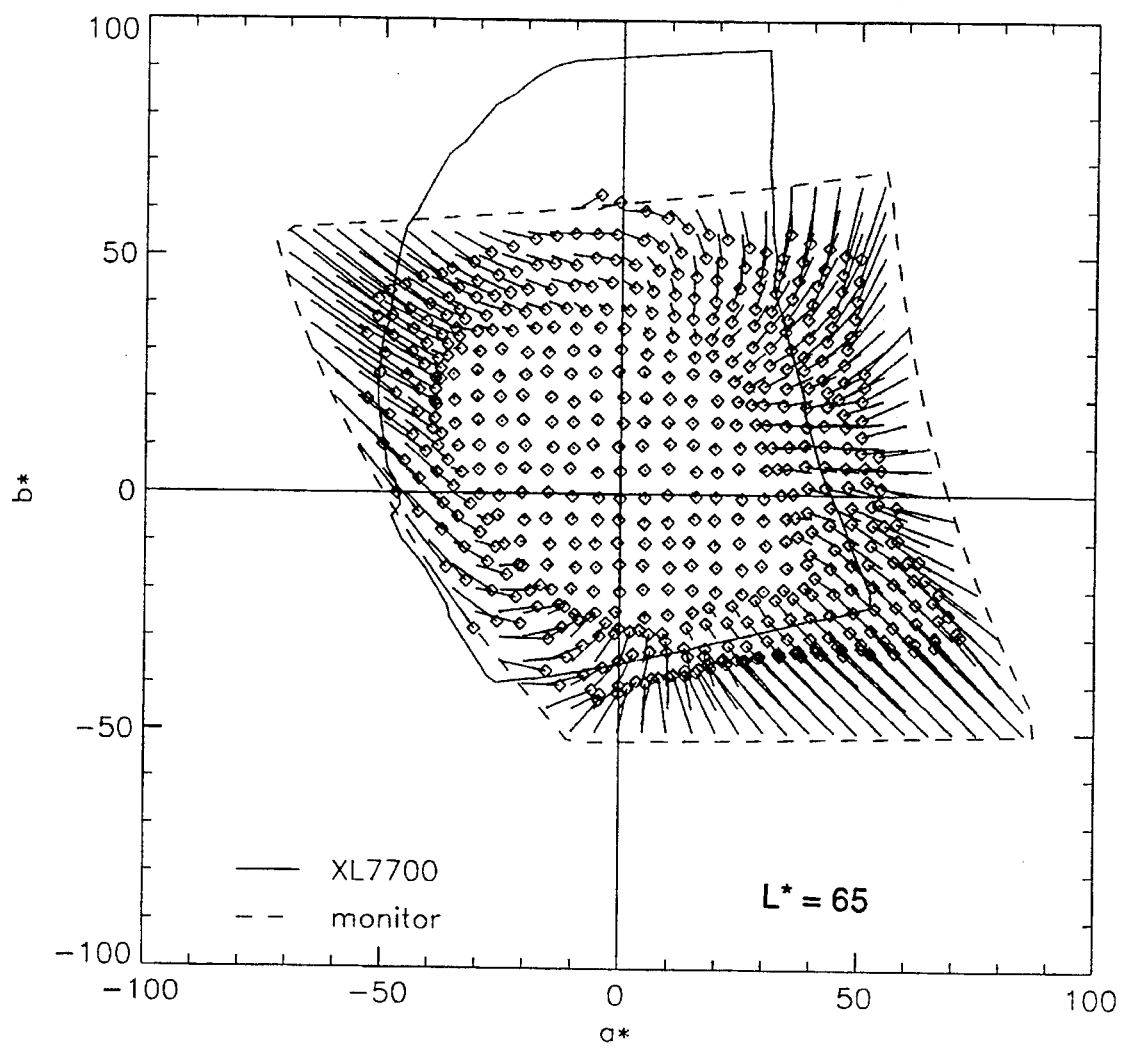
FIG. 9 is a plot showing the mapping of colors in the input video monitor gamut into colors in the Kodak XL7700 printer gamut using color mapping functions generated with the preferred embodiment of this invention at a lightness of $L^*=65.0$.
Figure 10:
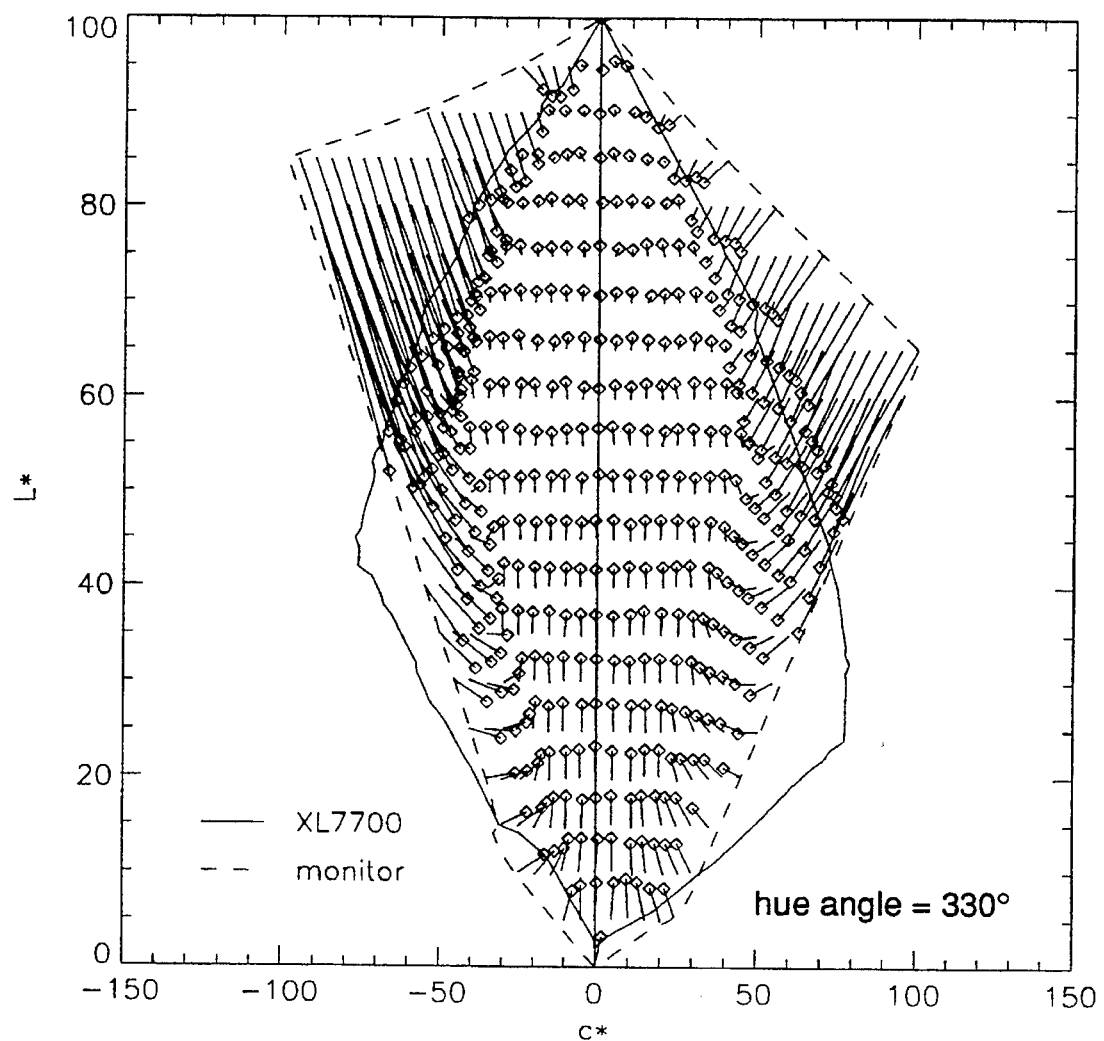
FIG. 10 is a plot showing the mapping of colors in the input video monitor gamut into colors in the Kodak XL7700 printer gamut using color mapping functions generated with the preferred embodiment of this invention at a hue angle of 330 degrees.

As an example, consider the case of mapping the colors on an RGB video display onto a Kodak XL7700 thermal printer. Since many of the colors inside the RGB video display gamut are outside the gamut of colors which can be reproduced on the printer, it is necessary to use a gamut mapping technique to map the input color values to the output color values. Techniques such as that described by Spaulding et. al. (U.S. patent application Ser. No. 08/017, 198, Kodak Docket No. 67,248), can be used to map the input color gamut to the output color gamut, but these techniques may have an undesirable effect on colors such as skin tones which typically should be reproduced colorimetrically. The present invention provides a method for simultaneously specifying the desired color mapping for the highly saturated out-of-gamut colors, while maintaining colorimetric reproduction for other colors such as skin tones. FIGS. 9 and 10 show slices in the CIELAB color space in which colors in the RGB video gamut are mapped to colors in the output color gamut using a three-dimensional look-up table generated with the preferred embodiment of this invention. The vectors in these plots represent the color difference between the input and output color values for each of the colors in that slice. The tails of the vectors represent the color values for the input video display. The heads of the vectors (corresponding to the diamond symbols) represent the color values for the output printer. In this example, a core region of colors with low saturation was constrained to be reproduced using a colorimetric mapping strategy. The highly saturated colors corresponding to the gamut boundary of the video display device were constrained to be reproduced using the mapping strategy described by Spaulding et. al. It can be seen that the intermediate colors are mapped in a smooth fashion connecting the two constrained regions.

Figure 11:
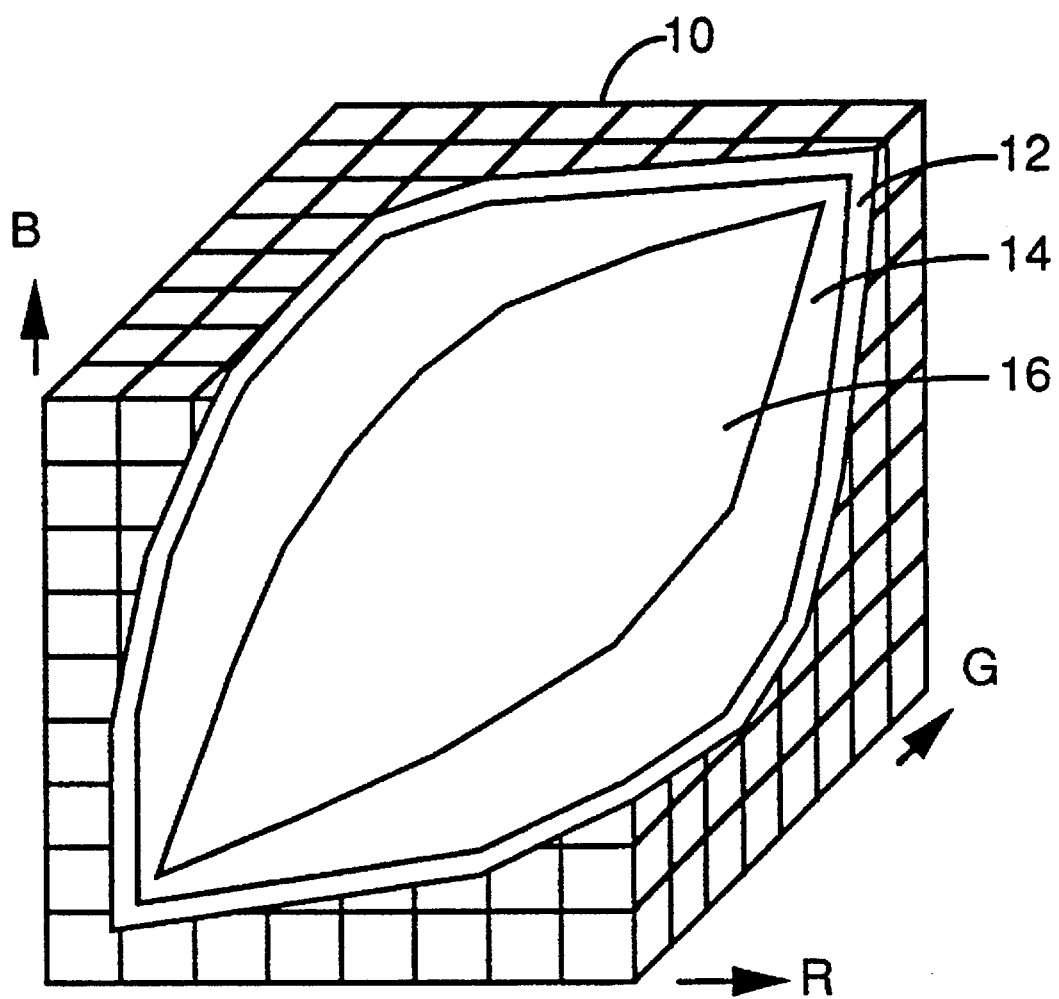
FIG. 11 is a cut-away perspective view of an input RGB color space segmented into three subsets.

Referring to FIG. 11, an RGB input color space 10 is divided into three subsets. Subset 12 is the collection of the most saturated color values. Subset 16 is a collection of relatively unsaturated color values of the type commonly found in photographic scenes. A color enhancement strategy is assigned to subset 12 which performs a mapping of input colors to saturated colors in the output color space. A strategy for mapping input colors to output colors colorimetrically is applied to subset 16. The remaining colors forming subset 14 are mapped in a manner preserving continuity between the subsets 12 and 16.

Appendix A is a color rendering dictionary for a POSTSCRIPT level 2 implementation of a 3D look-up table for transforming a CIELAB input color space to a CMY output color space. The table was constructed using the method of the present invention and corresponds to the transform 116 in FIG. 4. It is to be understood that a large number of look-up table and interpolation table entries have been omitted to simplify the listing. Ellipses have been used to represent the location of omitted entries.

While there has been shown what are considered to be the preferred embodiments of the invention, it will be manifest that many changes and modifications may be made therein without departing from the essential spirit of the invention. It is intended, in the annexed claims, to cover all such changes and modifications as may fall within the true scope of the invention.

Appendix A

```
%--Copyright 1992 Eastman Kodak Company
/KOALA_2_MORPH52_15.CRD <<
/ColorRenderingType 1
/WhitePoint [0.9505 1.0 1.0890] % D65 illuminant
/MatrixPQR    [  0.40024 -0.22630  0.00000
                 0.70760  1.16532  0.00000
                -0.08081  0.04570  0.91822 ]
              % Cone primaries for D65 (Hunt & Pointer)
/RangePQR [-0.75 2.5 -0.75 2.5 -0.75 2.5]
/TransformPQR [{exch pop exch 3 get mul exch pop exch 3 get
                    div} bind
               {exch pop exch 4 get mul exch pop exch 4 get
                    div} bind
               {exch pop exch 5 get mul exch pop exch 5 get
                    div} bind ]
/EncodeLMN [{.9505 div dup 0.008856 le {7.787 mul 16 116 div
                    add}
             {.3333333 exp} ifelse} bind
            {1       div dup 0.008856 le {7.787 mul 16 116 div
                    add}
             {.3333333 exp} ifelse} bind
            {1.089 div dup 0.008856 le {7.787 mul 16 116 div
                    add}
             {.3333333 exp} ifelse} bind]
/MatrixABC [0 500 0 116 -500 200 0 0 -200]
/EncodeABC [{16 sub 100 div} bind
            {120 add 240 div} bind
            {120 add 240 div} bind]
/RangeABC [0 1 0 1 0 1]
/Tf_Lut0
<000000000000000001010202030304050506070708090a0b0b0c0d0e0e
...
efeff0f1f2f3f4f5f6f7f8f9fafbfdff>
/Tf_Lut1
<00000000000000000000010101020203030304040505050606070708 0809
...
ebedeeeff0f1f3f4f5f6f8f9fafcfdff>
/Tf_Lut2
<000000000000000001010202030303040405050506060707080809 0a0a
...
edeff0f1f2f3f4f6f7f8f9fafbfdfeff>
/RenderTable [
15 15 15 % Table dimensions
[ % Interpolation table
<0042bf0041a6003f8d043b71053a56003a41003f22003e06003e06003e06
...
257fff257fff257ffff53d9ff54acff4d8cff456aff3334ff2616ff2616>
] % End interpolation table
             3
{KOALA_2_MORPH52_15.CRD /Tf_Lut0 get exch 255.0 mul 0.5 add
   cvi get 255.0 div}
bind
{KOALA_2_MORPH52_15.CRD /Tf_Lut1 get exch 255.0 mul 0.5 add
   cvi get 255.0 div}
bind
{KOALA_2_MORPH52_15.CRD /Tf_Lut2 get exch 255.0 mul 0.5 add
   cvi get 255.0 div}
bind
] % End RenderTable
>> % End color-rendering dictionary
```

We claim:

1. A method for transforming input color values in an input color space to output color values in an output color space, comprising the steps of:

a) forming more than one subsets of input color values from portions of the input color space, at least one of said subsets containing all the color values of a line, of a surface or of a volume in said input color space;

b) assigning a color transform for transforming color values in said input color space to color values in said output color space to all the color values in each subset of input color values formed in step a);

c) forming the subset of input color values not included in the subsets of steps a);

d) forming a color transform for the input colors of step c) which preserves continuity with the transforms of step b); and e) transforming input color values in the input color space to output color values in the output color space using the combined transforms of steps b) and d).

2. The method according to claim 1 wherein the color transform of step d) is formed by tetrahedral interpolation.

3. The method according to claim 1 wherein the color transform of step d) is formed by tri-linear interpolation.

4. The method according to claim 1 wherein the color transform of step d) is formed by basis spline interpolation.

5. The method according to claim 1 wherein step b) includes a transform which is a colorimetric model.

6. The method according to claim 1 wherein step b) includes a transform which is a model of a photographic process.

7. The method according to claim 1 wherein step b) includes a transform which is a color enhancement strategy.

8. A method for transforming input color values in an input color space to output color values in an output color space, comprising the steps of:

a) forming a color transform for a first subset of color values in said input color space employing a first color mapping strategy;

b) forming a color transform for a second subset of color values in said input color space employing a second color mapping strategy;

c) forming a color transform for input color values in said input color space not included in said first and second subsets which preserves continuity with the transforms of steps a) and b); and d) transforming input color values in the input color space to output color values in the output color space using the combined transforms of steps a), b), and c);

wherein at least one of the first and second subsets contains all the color values of a line, of a surface or of a volume in said input color space.

9. A method for transforming input color values in an input color space to output color values in an output color space, comprising the steps of:

a) forming one or more subsets of input color values from portions of the input color space, at least one of said subsets containing all the color values of only a line or only a surface in said input color space;

b) assigning a color transform for transforming color values in said input color space to color values in said output color space to all the color values in each subset of input color values formed in step a);

c) forming the subset of input color values not included in the subsets of steps a);

d) forming a color transform for the input colors of step c) which preserves continuity with the transforms of step b); and e) transforming input color values in the input color space to output color values in the output color space using the combined transforms of steps b) and d).

10. A method for transforming input color values in an input color space to output color values in an output color space, comprising the steps of:

a) grouping color values of an input color space into groups representing common properties in a scene, at least one of said groups containing all color values of only a line or only a surface in said input color space;

b) generating a color transform for transforming color values in said input color space to color values in said output color space for all the color values in each of the groups of step a);

c) generating a color transform for any color values that were not grouped in step a); and d) transforming input color values in the input color space to output color values in the output color space using the combined transforms of steps b) and c).

11. A method for transforming input color values in an input color space to output color values in an output color space, comprising the steps of:

a) forming one or more subsets of input color values from portions of the input color space;

b) assigning a color transform for transforming color values in said input color space to color values in said output color space to all the color values in each subset of input color values formed in step a);

c) forming the subset of input color values not included in the subsets of steps a);

d) forming a color transform for the input colors of step c) which preserves continuity with the transforms of step b); and e) transforming input color values in the input color space to output color values in the output color space using the combined transforms of steps b) and d);

wherein the color transform of step d) is formed using a volumetric elastic continuum model.

12. A method for transforming input color values in an input color space to output color values in an output color space, comprising the steps of:

a) grouping color values of an input color space into groups representing common properties in a scene, at least one of said groups containing all color values of a line, of a surface or of a volume in said input color space;

b) generating a color transform for transforming color values in said input color space to color values in said output color space for all the color values in each of the groups of step a);

c) generating a color transform for any color values that were not grouped in step a); and d) transforming input color values in the input color space to output color values in the output color space using the combined transforms of steps b) and c).

13. The method according to claim 12 wherein the color transform of step c) is formed by tetrahedral interpolation.

14. The method according to claim 12 wherein the color transform of step c) is formed by tri-linear interpolation.

15. The method according to claim 12 wherein the color transform of step c) is formed by basis spline interpolation.

16. The method according to claim 12 wherein the color transform of step c) is formed using a colormetric model.

17. The method according to claim 12 wherein one of said groups of step a) represents a volume of color space containing a range of hues, saturations, and/or lightnesses.

18. The method according to claim 12 wherein step b) includes a transform which is a colorimetric model.

19. The method according to claim 12 wherein step b) includes a transform which is a color enhancement strategy.

20. Apparatus for transforming input color values in an input color space to output color values in an output color space, comprising:

means for forming one or more subsets of input color values from portions of the input color space, at least one of said subsets containing all the color values of only a line or only a surface in said input color space;

means for assigning a color transform for transforming color values in said input color space to color values in said output color space to all the color values in each of said subsets;

means for forming an additional subset of input color values not included in said one or more subsets; means for forming a color transform for the input colors of said additional subset which preserves continuity with the assigned transforms; and means for transforming input color values in the input color space to output color values in the output color space using the formed and assigned transforms.

21. A storage means for storing a transform for transforming input color values in an input color space to output values in an output color space wherein said transform comprises:

a) a transform for transforming one or more subsets of input color values, at least one of said subsets containing all the color values of only a line or only a surface in said input color space, to output color values; and b) a transform for transforming the subset of input color values not included in the subsets of step a, to output color values, which preserves continuity with the transforms of step a.

22. A storage means for storing a transform for transforming input color values in an input color space to output color values in an output color space wherein said transform comprises:

a) a first transform for transforming a first subset of input color values according to a first mapping strategy;

b) a second transform for transforming a second subset of input color values according to a second mapping strategy different from said first; and c) a third transform for transforming a subset of input color values not included in the subsets of step a. of b., which preserves continuity with the transforms of step a. and b;

wherein said third transform employs a volumetric elastic continuum model.

23. A method for transforming input color values in an input color space to output color values in an output color space, comprising the steps of:

a) grouping color values of an input color space into groups representing common properties in a scene;

b) generating a color transform for transforming color values in said input color space to color values in said output color space for all the color values in each of the groups of step a);

c) generating a color transform for any color values that were not grouped in step a); and d) transforming input color values in the input color space to output color values in the output color space using the combined transforms of steps b) and c );

wherein step b) includes a transform which is a model of a photographic process.

24. A method for transforming input color values in an input color space to output color values in an output color space, comprising the steps of:

a) grouping color values of an input color space into groups representing common properties in a scene;

b) generating a color transform for transforming color values in said input color space to color values in said output color space for all the color values in each of the groups of step a);

c) generating a color transform for any color values that were not grouped in step a); and d) transforming input color values in the input color space to output color values in the output color space using the combined transforms of steps b) and c);

wherein the color transform of step c) is formed using a volumetric elastic continuum model.

25. A method for transforming input color values in an input color space to output color values in an output color space, comprising the steps of:

a) grouping color values of an input color space into one or more groups representing common properties in a scene;

b) generating a color transform for transforming color values in said input color space to color values in said output color space for all the color values in each of the groups of step a);

c) generating a color transform for any color values that were not grouped in step a); and d) transforming input color values in the input color space to output color values in the output color space using the combined transforms of steps b) and c);

wherein one of said groups of step a) represents flesh tones.

26. Apparatus for transforming input color values in an input color space to output color values in an output color space, comprising:

means for forming more than one subsets of input color values from portions of the input color space, at least one of said subsets containing all the color values of a line, of a surface or of a volume in said input color space;

means for assigning a color transform for transforming color values in said input color space to color values in said output color space to all the color values in each of said subsets;

means for forming an additional subset of input color values not included in said one or more subsets; means for forming a color transform for the input colors of said additional subset which preserves continuity with the assigned transforms; and means for transforming input color values in the input color space to output color values in the output color space using the formed and assigned transforms.

27. A storage means for storing a transform for transforming input color values in an input color space to output values in an output color space wherein said transform comprises:

a) a transform for transforming more than one subsets of input color values, at least one of said subsets containing all the color values of a line, of a surface or of a volume in said input color space, to output color values; and b) a transform for transforming the subset of input color values not included in the subsets of step a, to output color values, which preserves continuity with the transforms of step a.

28. The storage means according to claim 27 wherein at least one of said plurality of transforms includes a transform which is a colorimetric model.

29. The storage means according to claim 27 wherein at least one of said plurality of transforms includes a transform which is a model of a photographic process.

30. The storage means according to claim 27 wherein at least one of said plurality of transforms includes a transform which is a color enhancement strategy.

31. The storage means according to claim 27 wherein at least one of said plurality of transforms includes a transform which maintains continuity between the other transforms.

32. A method for transforming input color values in an input color space to output color values in an output color space, comprising the steps of:
 a) forming one or more subsets of input color values from portions of the input color space;
 b) assigning a color transform for transforming color values in said input color space to color values in said output color space to each subset of input color values formed in step a);
 c) forming the subset of input color values not included in the subsets of step a);
 d) forming a color transform using a volumetric elastic continuum model for transforming the input colors of step c) which preserves continuity with the transforms of step b); and
 e) transforming input color values in the input color space to output color values in the output color space using the combined transforms of steps b) and d).

33. A method for transforming input color values in an input color space to output color values in an output color space, comprising the steps of:
 a) grouping color values of an input color space into groups representing common properties in a scene;
 b) generating a color transform for transforming color values in said input color space to color values in said output color space for each of the groups of step a);
 c) generating a color transform using a volumetric elastic continuum model for transforming any color values that were not grouped in step a); and
 d) transforming input color values in the input color space to output color values in the output color space using the combined transforms of steps b) and c).

34. Apparatus for transforming input color values in an input color space to output color values in an output color space, comprising:
 means for forming one or more subsets of input color values from portions of the input color space;
 means for assigning a color transform for transforming color values in said input color space to color values in said output color space to each of said subsets;
 means for forming an additional subset of input color values not included in said one or more subsets;
 means for forming a color transform using a volumetric elastic continuum model for transforming color values in said input color space to color values in said output color space for the input colors of said additional subset which preserves continuity with the assigned transforms; and
 means for transforming input color values in the input color space to output color values in the output color space using the formed and assigned transforms.

35. A storage means for storing a transform for transforming input color values in an input color space to output color values in an output color space wherein said transform comprises:
 a. a transform for transforming one or more subsets of input color values to output color values; and
 b. a transform for transforming the subset of input color values not included in the subsets of step a, to output color values, which preserves continuity with the transforms of step a, said transform using a volumetric elastic continuum model.

36. A method for transforming input color values in an input color space to output color values in an output color space, comprising the steps of:
 a) forming a color transform for a first subset of color values in said input color space employing a first color mapping strategy;
 b) forming a color transform for a second subset of color values in said input color space employing a second color mapping strategy;
 c) forming a color transform for the remainder of input color values in said input color space not included in said first and second subsets which preserves continuity with the transforms of steps a) and b); and
 d) transforming input color values in the input color space to output color values in the output color space using the combined transforms of steps a), b), and c);
wherein at least one of the first and second subsets contains all the color values of a line, of a surface or of a volume in said input color space.

37. A storage means for storing a transform for transforming input color values in an input color space to output color values in an output color space wherein said transform comprises:
 a) a first transform for transforming a first subset of input color values to output color values according to a first mapping strategy;
 b) a second transform for transforming a second subset of input color values to output color values according to a second mapping strategy different from said first; and
 c) a third transform for transforming a subset of input color values not included in the subsets of step a. of b., which preserves continuity with the transforms of step a. and b;
wherein at least one of the first and second subsets contains all the color values of a line, of a surface or of a volume in said input color space.

* * * * *